United States Patent
Roberts et al.

(10) Patent No.: US 9,284,202 B2
(45) Date of Patent: Mar. 15, 2016

(54) SYSTEM FOR TREATING WATER AND/OR WASTEWATER HAVING A PLURALITY OF LATERALS THAT CAN BE READILY CLEANED WITHOUT DAMAGING OR SACRIFICING THE LATERALS

(71) Applicant: Roberts Marketing DE, Inc., Wilmington, DE (US)

(72) Inventors: R Lee Roberts, Rose Valley, PA (US); Troy A. Jackson, Camden-Wyoming, DE (US)

(73) Assignee: Roberts Marketing DE, Inc., Wilmington, DE (US)

( * ) Notice: Subject to any disclaimer, the term of this patent is extended or adjusted under 35 U.S.C. 154(b) by 186 days.

(21) Appl. No.: 13/957,972

(22) Filed: Aug. 2, 2013

(65) Prior Publication Data

US 2015/0034548 A1     Feb. 5, 2015

(51) Int. Cl.
| | |
|---|---|
| *C02F 11/00* | (2006.01) |
| *C02F 3/12* | (2006.01) |
| *C02F 3/10* | (2006.01) |
| *B01D 24/46* | (2006.01) |
| *B01D 21/24* | (2006.01) |

(52) U.S. Cl.
CPC ... *C02F 3/12* (2013.01); *C02F 3/10* (2013.01); *B01D 21/245* (2013.01); *B01D 24/4636* (2013.01); *C02F 2203/006* (2013.01); *C02F 2303/16* (2013.01)

(58) Field of Classification Search
CPC ............. C02F 11/00; C02F 3/10; C02F 3/13; C02F 2303/16; C02F 2203/006; B01D 21/245; B01D 24/4636; F16L 55/1141

USPC ........... 210/232, 274, 275, 279, 289, 291, 210/532.1; 134/22.12; 138/89
See application file for complete search history.

(56) References Cited

U.S. PATENT DOCUMENTS

| | | | | |
|---|---|---|---|---|
| 3,402,126 | A * | 9/1968 | Cioffi .............................. | 521/26 |
| 3,578,027 | A * | 5/1971 | Zopfi .............................. | 138/89 |
| 5,911,241 | A * | 6/1999 | Roberts .................... | 137/625.11 |
| 6,325,931 | B1 * | 12/2001 | Roberts et al. ................ | 210/293 |
| 2011/0278239 | A1 * | 11/2011 | Roberts ......................... | 210/800 |

FOREIGN PATENT DOCUMENTS

FR     2724574 A1 *  3/1996

* cited by examiner

*Primary Examiner* — Matthew O Savage
(74) *Attorney, Agent, or Firm* — Merek, Blackmon & Voorhees, LLC

(57) ABSTRACT

A plurality of laterals operably associated with a treatment unit for treating water and/or wastewater. The plurality of laterals can form many systems including a sludge removal system and a fluid scour system. The treatment unit can take many forms including but not limited to a filter and a sludge collection basin. Preferably, each of the plurality of laterals has a hollow passageway for permitting at least one of a fluid and a material to flow through each of the plurality of laterals. Each of the plurality of laterals includes means for permitting cleaning of a corresponding lateral to remove one or more obstructions obstructing the flow of one of a fluid and a material through at least a portion of the hollow passageway without damaging or altering the corresponding lateral. Preferably, the means for cleaning is configured to seal an opening in the corresponding lateral.

7 Claims, 4 Drawing Sheets

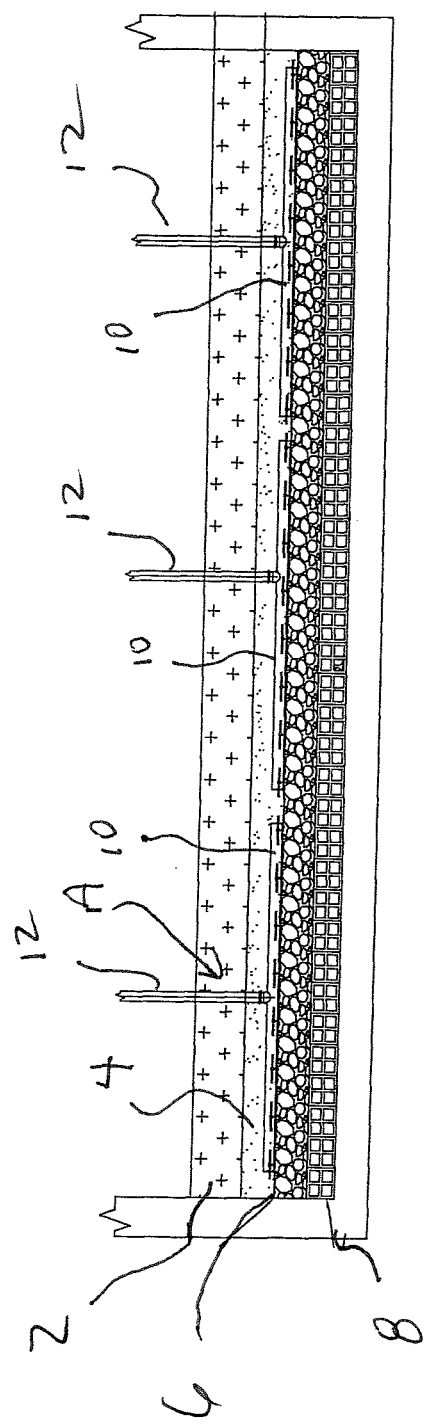

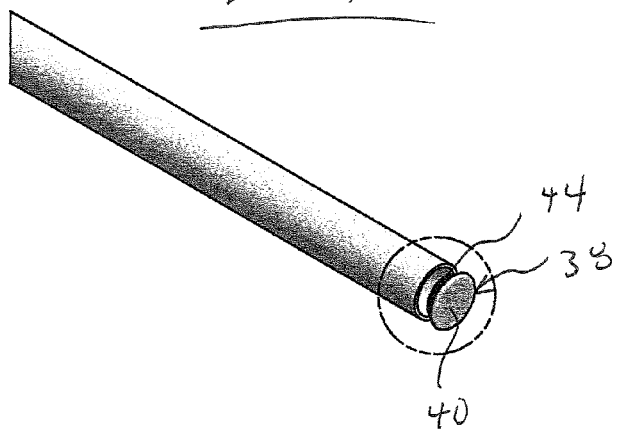
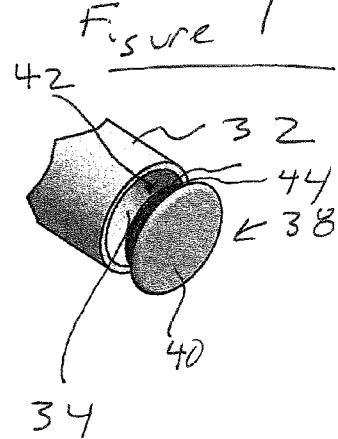
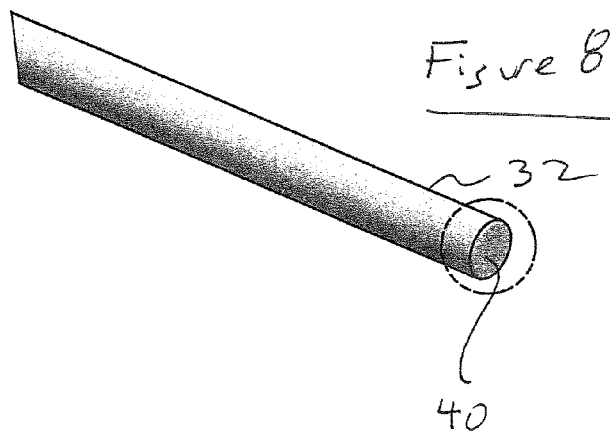
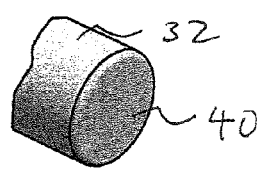

SYSTEM FOR TREATING WATER AND/OR WASTEWATER HAVING A PLURALITY OF LATERALS THAT CAN BE READILY CLEANED WITHOUT DAMAGING OR SACRIFICING THE LATERALS

FIELD OF THE INVENTION

The present invention is directed to a system for treating water and/or wastewater wherein the system includes a plurality of laterals operably associated with a water and/or wastewater treatment unit. Each of the plurality of laterals includes a passageway for permitting one of a fluid and a material to flow through the corresponding lateral. Each of the plurality of laterals is configured such that the lateral can be readily cleaned to remove any obstruction obstructing flow of one of a fluid and a material through the passageway without damaging or altering the lateral. The water and/or wastewater treatment unit can take many forms including but not limited to an upflow filter, a downflow filter, a biflow filter, a sludge collection basin, etc. The term filter as used herein includes a structure having at least one layer of filter media for removing at least some impurities from water or wastewater passing through the filter media. The term filter includes but is not limited to clarifiers.

BACKGROUND OF THE INVENTION

Lateral have been used with water and/or wastewater treatment units to improve the efficiency of the water and/or wastewater treatment units. For example, laterals have been used in sludge removal systems operably associated with a sludge collection basin to remove sludge from the basin. Sludge removal systems typically include a plurality of laterals that sit in a sludge collection environment and operate to remove collected sludge from the sludge collection environment. Where the sludge removal system is not maintained properly, clogging of the sludge removal laterals can occur. Current procedures implemented in an attempt to clean clogged laterals are extremely ineffective and often lead to the clogged laterals being discarded and replaced with a new collection lateral. Prior cleaning procedures are undesirable as they are time consuming and lead to additional costly replacement of clogged laterals.

Laterals have also been used in fluid scour system where a pressurized fluid passes through the laterals disposed in a filter bed. The pressurized fluid is released into the filter bed through openings formed in the laterals. Screens have been placed about the openings to prevent fine media from passing into the lateral. Regardless of whether screens are used about the openings or slots formed in the laterals of the fluid scour system, the laterals can become partially or completely clogged such that little or no fluid is released into the filter bed from the clogged lateral. This is extremely undesirable as the portion of the filter bed surrounding the clogged lateral will not be properly cleaned thereby reducing the efficiency of the filter. Prior designs of laterals make it virtually impossible to effectively clean clogged laterals without damaging the lateral to such an extent that the clogged lateral must ultimately be discarded.

Therefore, there exists a significant need for a system that includes laterals that can be readily cleaned without damaging, altering or sacrificing any lateral that may become clogged during use of the system in connection with a water and/or wastewater treatment unit.

OBJECTS AND SUMMARY OF THE INVENTION

An object of the present invention is to provide a novel and unobvious lateral type enhancement system used in connection with a water and/or wastewater treatment unit to enhance the operation of the water and/or wastewater treatment unit.

Another object of a preferred embodiment of the present invention is to provide a lateral type enhancement system used in connection with a water and/or wastewater treatment unit to enhance the operation of the water and/or wastewater treatment unit where each lateral of the enhancement system is configured such that it can be readily cleaned to remove any blockage obstructing the flow of one of a fluid and a material through the lateral without damaging, altering or sacrificing the clogged lateral.

A further object of a preferred embodiment of the present invention is to provide a sludge removal system having a plurality of laterals where each lateral of the sludge removal system is configured such that it can be readily cleaned to remove any blockage obstructing the flow of sludge through the lateral without damaging, altering or sacrificing the clogged lateral.

Yet another object of a preferred embodiment of the present invention is to provide a fluid scour system having a plurality of laterals where each lateral of the sludge removal system is configured such that it can be readily cleaned to remove any blockage obstructing the flow of fluid through the lateral without damaging, altering or sacrificing the clogged lateral.

Still another object of a preferred embodiment of the present invention is to provide a lateral type enhancement system used in connection with a water and/or wastewater treatment unit to enhance the operation of the water and/or wastewater treatment unit where the enhancement system includes a plurality of laterals having a removable sealing plug inserted in each of the ends of the lateral that can be readily removed without damaging, altering or sacrificing the corresponding lateral.

Yet a further object a preferred form of the present invention is to provide a removable sealing plug inserted in the ends of one or more laterals where the sealing plug is configured such that it can be partially or completely dislodged from the corresponding lateral by a high pressure fluid passing through the corresponding lateral.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a system for treating water or wastewater. The system preferably includes a treatment unit for treating at least one of water and wastewater. The system further includes a plurality of laterals operably associated with the treatment unit. Each of the plurality of laterals has a hollow passageway for permitting at least one of a fluid and a material to flow through each of the plurality of laterals. Each of the plurality of laterals includes means for permitting cleaning of a corresponding lateral to remove one or more obstructions obstructing the flow of one of a fluid and a material through at least a portion of the hollow passageway without damaging or altering the corresponding lateral. The means for cleaning is configured to seal an opening in the corresponding lateral.

Another preferred embodiment of the present invention is directed to a system for treating water or wastewater. The system includes a sludge collection basin for collecting sludge and a sludge removal system for removing sludge collected in the sludge collection basin. The sludge removal system includes a plurality of laterals disposed in the sludge collection basin. Each of the plurality of laterals has a hollow passageway. Each of the plurality of laterals further includes a removable section for permitting cleaning of a corresponding lateral to remove one or more obstructions obstructing the flow of sludge through at least a portion of the hollow passageway without damaging or altering the corresponding lateral.

A further preferred embodiment of the present invention is directed to a system for treating water or wastewater. The system includes a filter having at least one layer of filter media for removing impurities from water or wastewater passing through the at least one layer of filter media. The system further includes an air scour system for directing air through the at least one layer of filter media. The air scour system includes a plurality of laterals disposed in the filter. Each of the plurality of laterals has a hollow passageway. Each of the plurality of laterals further include a removable section for permitting cleaning of a corresponding lateral to remove one or more obstructions obstructing the flow of air through at least a portion of the hollow passageway without damaging or altering the corresponding lateral.

BRIEF DESCRIPTION OF THE DRAWINGS

FIG. 5 is a cross-sectional view of one environment in which an air scour system including the features of the present invention may be deployed.

FIG. 6 is a fragmentary perspective view of a portion of a sludge removal system formed in accordance with a preferred embodiment of the present invention with the preferred form of removable, sealing plug removed from an end of the corresponding lateral.

FIG. 7 is an enlarged view of the dashed lined portion of FIG. 6.

FIG. 8 is a fragmentary perspective view of a portion of a sludge removal system formed in accordance with a preferred embodiment of the present invention with the preferred form of removable, sealing plug inserted in an end of the corresponding lateral.

FIG. 9 is an enlarged view of the dashed lined portion of FIG. 8.

DETAILED DESCRIPTION OF THE PREFERRED EMBODIMENTS OF THE INVENTION

Figure 1:
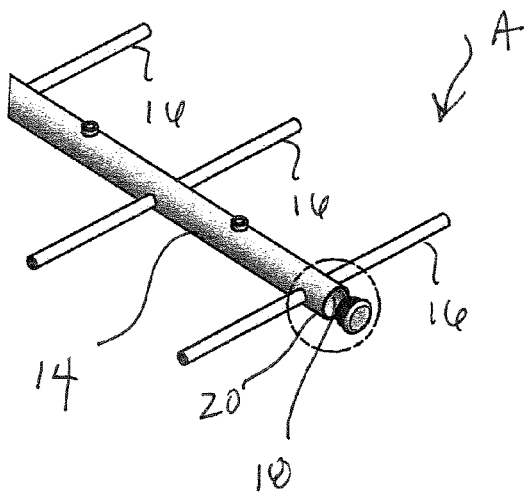
FIG. 1 is a fragmentary perspective view of a portion of an air scour system formed in accordance with a preferred embodiment of the present invention with the preferred form of removable, sealing plug removed from an end of the corresponding lateral.

The preferred forms of the invention will now be described with reference to FIGS. 1-10. The appended claims are not limited to the preferred forms and no term and/or phrase used herein is to be given a meaning other than its ordinary meaning unless it is expressly stated that the term and/or phrase shall have a special meaning. The term "filter" as used herein is to be broadly interpreted to include a device in which at least a portion of the impurities in a liquid are removed including but not limited to a clarifier, a polishing filter and/or a contactor. The phrase "high pressure fluid through the corresponding lateral" is to be broadly interpreted to include a pressure of a fluid greater than the pressure of fluid in the lateral during normal use of the lateral. The term "basin" is to be broadly interpreted to include any structure capable of collecting sludge. It is to be further noted that the phrase "treatment unit for treating one of water and wastewater" is to be broadly construed as any structure used in any aspect of treating water or wastewater. While the preferred forms of treatment units described below are an air scour system and a sludge removal system, the phrase "treatment unit for treating one of water and wastewater" is in no way limited to these systems.

FIGS. 1-5

Referring to FIGS. 1 to 5, a portion of an air scour system A utilizing a preferred form of the present invention is illustrated in one of many possible configurations. The air scour system can take many forms and can include multiple components including an air supply header, connecting tubes, one or more header pipes from which one or more laterals extend and one or more diffusion nozzles operably connected to the one or more laterals. An air scour system utilizing a preferred form of the present invention can be constructed in a grid form as described in U.S. Pat. No. 5,534,202 the entire contents of which is incorporated herein by reference. It should be noted that the air scour system can be as simple as a single lateral connected to an air supply.

Referring to FIG. 5, an air scour system A utilizing a preferred form of the present invention is positioned in a downflow filter B. Downflow filter B includes filter media layers 2 and 4 positioned above a gravel layer 6. The gravel layer 6 is supported by underdrain 8. It should be noted that the filter B could have only one layer of filter media or more than two layers of filter media. Further, there may be multiple layers of gravel. Moreover, the filter B may not have any layers of gravel. Air scour system A, as illustrated in FIG. 5, includes three header pipes 10 each connected to an air supply tube 12. The number of header pipes may be varied as desired. Each air supply tube 12 is connected to one or more air supply headers not shown. Eight laterals 14 are shown extending from each header pipe 10. The number of laterals 14 may be varied as desired. Laterals 14 are oriented perpendicular to the corresponding header pipe 10. Each of the laterals 14 preferably has a plurality of diffusion nozzles 16 extending outwardly therefrom. FIGS. 1 to 4 illustrate a portion of a preferred form of lateral 14.

Figure 2:
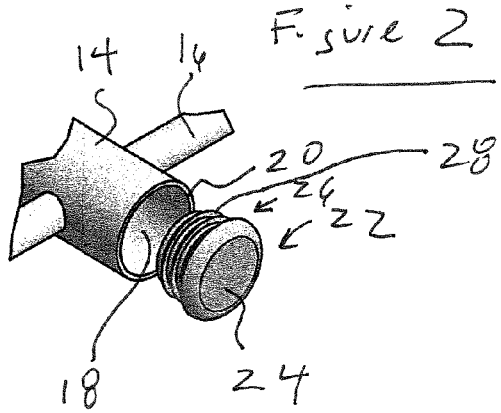
FIG. 2 is an enlarged view of the dashed lined portion of FIG. 1.
Figure 3:
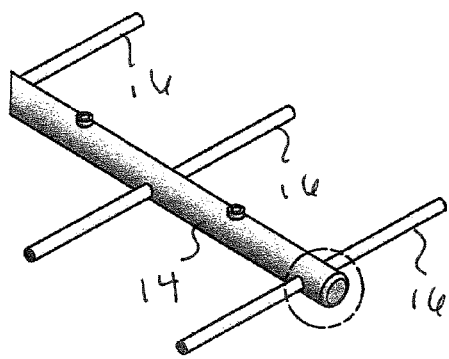
FIG. 3 is a fragmentary perspective view of a portion of an air scour system formed in accordance with a preferred embodiment of the present invention with the preferred form of removable, sealing plug inserted in an end of the corresponding lateral.
Figure 4:
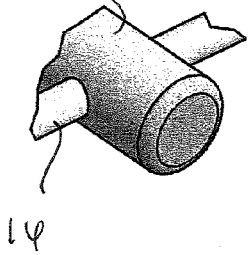
FIG. 4 is an enlarged view of the dashed lined portion of FIG. 1.
Figure 10:
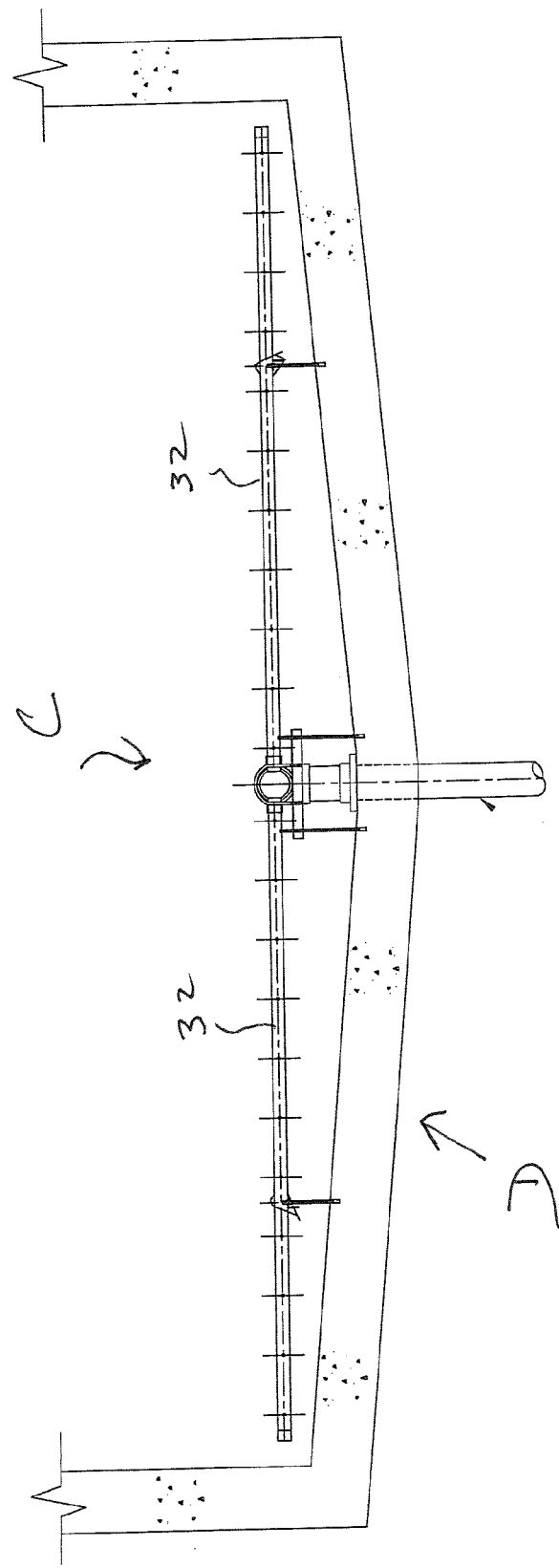
FIG. 10 is a cross-sectional view of one environment in which a sludge removal system including the features of the present invention may be deployed.

Referring to FIGS. 1 and 2, each lateral includes a hollow passageway 18 that preferably extends the length of the lateral 14 and communicates with two open ends 20 (only one or which is shown). A removable sealing plug 22 is inserted in each open end 20 of lateral 14. Sealing plugs 22 are preferably formed from an elastomeric material. However, it should be readily understood that any suitable material may be used. Laterals 14 are most preferably formed from stainless steel. Again, it is to be understood that laterals 14 can be formed from any suitable material. Removable sealing plug 22 includes a cap section 24 and a shaft section 26. The shaft section 26 preferably includes a plurality of radially, outwardly extending annular ribs 28. The cap section 24 and the shaft section 26 are preferably formed as one-piece.

Referring to FIG. 2, the end of the lateral 14 that shaft 26 of plug 22 extends into is free of depressions or protrusions such that no portion of the inner surface of lateral 14 nests in or interlocks with any portion of shaft 26 or any other portion of sealing plug 22. Rather, sealing plug 22 is maintained in the corresponding end of each lateral 14 solely by the friction created between ribs 28 and the inner surface of lateral 14. In the most preferred embodiment, ribs 28 have a larger diameter than the inner diameter of the corresponding end of lateral 14 such that ribs 28 deform when inserted in the end of the lateral 14 and create sufficient friction between the plug 22 and the corresponding end of lateral 14 to maintain plug 22 in the sealing position shown in FIGS. 3 and 4 during normal operation of air scour system A. Ribs 28 and cap 24 act to seal the corresponding end of lateral 14.

The above operable association of removable sealing plug 22 and the corresponding end of lateral 14 allows for the removal of plug 22 to permit cleaning of lateral 14 without altering or damaging in anyway any portion of lateral 14. In the most preferred form of the present invention, plug 22 can be partially or completely dislodged from the corresponding end of lateral 14 by passing a high pressure fluid through the lateral 14 that acts to force plug 22 to move partially or completely out of the corresponding end of lateral 14. It should be noted that the high pressure fluid may be directed through the entire air scour system A by passing a high pressure fluid downwardly through each of the tubes 12 such that all plugs 22 are partially or completely dislodged from the corresponding end of lateral 14. Alternatively, the high pressure fluid can be directed through only a portion of the air scour system A.

It should be noted that where a high pressure fluid is directed through the lateral to completely dislodge plug 22 from the corresponding end of lateral 14 any blockage or obstruction in the lateral may be freed by the high pressure fluid flowing through lateral 14. In the most preferred form, plug 22 is configured such that it will not become partially or completely dislodged from lateral 14 at pressures of approximately 6 psi or less and will be fully dislodged at pressures of approximately 60 psi or greater.

It should be noted that plugs 22 can be removed manually by an individual and once removed will allow sufficient access to free any obstruction or blockage in the lateral through use of a cleaning tool inserted into the end of the lateral or a cleaning fluid directed through the lateral. The cleaning fluid could be a liquid or a gas.

FIGS. 6-10

Referring to FIGS. 6 to 10, a portion of a sludge removal system C utilizing a preferred form of the present invention is illustrated in one of many possible configurations. The sludge removal system can take many forms and can include multiple components. The sludge removal system utilizing a preferred form of the present invention can be constructed in a grid form as described in U.S. Pat. No. 5,911,241 the entire contents of which is incorporated herein by reference. It should be noted that the sludge removal system can be as simple as a single collection lateral connected to a sludge evacuation means whereby sludge from the sludge basin or container is pulled through the single collection lateral through the evacuation means to remove sludge collected in the sludge basin or container.

Referring to FIGS. 6 to 9, the preferred form of sludge removal system C includes one or more laterals 32 having a hollow passageway 34 that preferably extends the length of the lateral 32 and communicates with two open ends 36 (only one or which is shown). A removable sealing plug 38 is inserted in each open end 36 of lateral 32. Sealing plugs 38 are preferably formed from an elastomeric material. However, it should be readily understood that any suitable material may be used. Laterals 32 are most preferably formed from PVC. Again, it is to be understood that laterals 32 can be formed from any suitable material. Removable sealing plug 38 includes a cap section 40 and a shaft section 42. The shaft section 42 preferably includes a plurality of radially, outwardly extending annular ribs 44. The cap section 40 and the shaft section 42 are preferably formed as one-piece.

Referring to FIG. 7, the end of the lateral 32 that shaft section 42 of plug 38 extends into is free of depressions or protrusions such that no portion of the inner surface of lateral 32 nests in or interlocks with any portion of shaft section 42 or any other portion of sealing plug 38. Rather, sealing plug 38 is maintained in the corresponding end of each lateral 32 solely by the friction created between ribs 44 and the inner surface of lateral 32. In the most preferred embodiment, ribs 44 have a larger diameter than the inner diameter of the corresponding end of lateral 32 such that ribs 44 deform when inserted in the end of the lateral 32 and create sufficient friction between the plug 38 and the corresponding end of lateral 32 to maintain plug 38 in the sealing position shown in FIGS. 8 and 9 during normal operation of sludge removal system C.

Ribs 44 and cap 40 act to seal the corresponding end of lateral 32. This operable association of removable sealing plug 38 and the corresponding end of lateral 32 allows for the removal of plug 38 to permit cleaning of lateral 32 without altering or damaging in anyway any portion of lateral 32. In the most preferred form of the present invention, plug 38 can be partially or completely dislodged from the corresponding end of lateral 32 by passing a high pressure fluid through the lateral 32 that acts to force plug 38 to move partially or completely out of the corresponding end of lateral 32. It should be noted that the high pressure fluid may be directed through the sludge removal system C by passing a high pressure downwardly through all components of the sludge removal system C. Alternatively, the high pressure fluid can be directed through only a portion of the sludge removal system C.

It should be noted that where a high pressure fluid is directed through the lateral to completely dislodge plug 38 from the corresponding end of lateral 32 any blockage or obstruction in the lateral may be freed by the high pressure fluid flowing through lateral 32. In the most preferred form, plug 38 is configured such that it will not become partially or completely dislodged from lateral 32 at pressures less than 20 psi.

It should be noted that plugs 38 can be removed manually by an individual and once removed will allow sufficient access to free any obstruction or blockage in the lateral through use of a cleaning tool inserted into the end of the lateral or a cleaning fluid directed through the lateral. The cleaning fluid could be a liquid or a gas.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A system for treating water or wastewater, said system comprising:
   (a) a treatment unit for treating at least one of water and wastewater; and
   (b) a plurality of laterals operably associated with said treatment unit, each of said plurality of laterals having a hollow passageway for permitting at least one of a fluid and a material to flow through each of said plurality of laterals, each of said plurality of laterals including a removable plug inserted into the open end of the corresponding lateral for permitting cleaning of a corresponding lateral to remove one or more obstructions obstructing the flow of one of a fluid and a material through at least a portion of the hollow passageway without damaging or altering the corresponding lateral, said plug being configured to seal the opening in the corresponding lateral, said removable plug is connected to the open end of the corresponding lateral such that at least a portion of the removable plug can be dislodged from the opening of the corresponding lateral by a high pressure fluid passing through the corresponding lateral without damaging or altering the corresponding lateral.

2. A system as recited in claim 1, wherein: (a) said treatment unit includes a sludge collection basin; and, (b) said plurality of laterals form at least a portion of a sludge removal system for removing sludge from the sludge collection basin.

3. A system as recited in claim 1, wherein: (a) said treatment unit is a filter having at least one layer of filter media for removing impurities from water or wastewater; and, (b) said plurality of laterals form at least a portion of a fluid scour system configured to direct a washing fluid through the at least one layer of filter media.

4. A system as recited in claim 1, wherein: (a) said removable plug includes a shaft configured to be inserted into the open end of the corresponding lateral, said removable plug further includes a cap for sealing the open end of the corresponding lateral.

5. A system as recited in claim 4, wherein: (a) said shaft of said removable plug includes a plurality of ribs that engage an inner surface of the corresponding lateral.

6. A system as recited in claim 5, wherein: (a) the inner surface surrounds and extends at least the length of the shaft of the removable plug, the inner surface is free of depressions or protrusions such that no portion of the inner surface nests in any recess formed between the plurality of ribs of the shaft of the removable plug.

7. A system as recited in claim 1, wherein: (a) said removable plug is connected to the open end of the corresponding lateral such that the removable plug can be completely dislodged from the corresponding lateral by a high pressure fluid passing through the corresponding lateral.

* * * * *